United States Patent
Kim

(10) Patent No.: US 7,509,294 B2
(45) Date of Patent: Mar. 24, 2009

(54) SYNTHESIS SUBBAND FILTER FOR MPEG AUDIO DECODER AND A DECODING METHOD THEREOF

(75) Inventor: Yun-young Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 11/024,749

(22) Filed: Dec. 30, 2004

(65) Prior Publication Data

US 2005/0154597 A1 Jul. 14, 2005

(30) Foreign Application Priority Data

Dec. 30, 2003 (KR) ................ 10-2003-0099746

(51) Int. Cl.
- G10L 21/04 (2006.01)
- G10L 19/00 (2006.01)
- G06F 17/16 (2006.01)
- G06F 17/00 (2006.01)

(52) U.S. Cl. ............ 705/500; 704/501; 704/270; 700/94

(58) Field of Classification Search ......... 704/500–504, 704/270–278; 700/94; 381/71.11–71.14; 382/162–180, 276–308
See application file for complete search history.

(56) References Cited

U.S. PATENT DOCUMENTS

| 6,829,016 B2 * | 12/2004 | Hung ..................... 348/581 |
| 6,885,992 B2 * | 4/2005 | Mesarovic et al. ......... 704/500 |
| 7,050,980 B2 * | 5/2006 | Wang et al. .............. 704/503 |
| 7,155,383 B2 * | 12/2006 | Chen et al. ............... 704/201 |
| 7,305,139 B2 * | 12/2007 | Srinivasan et al. ......... 382/248 |
| 2002/0147752 A1 * | 10/2002 | Todoroki et al. ........... 708/402 |
| 2002/0178012 A1 * | 11/2002 | Wang et al. .............. 704/503 |
| 2003/0088423 A1 * | 5/2003 | Nishio et al. ............. 704/500 |
| 2004/0013052 A1 * | 1/2004 | Sako et al. .............. 369/30.05 |
| 2004/0158472 A1 * | 8/2004 | Voessing ................ 704/500 |
| 2005/0075861 A1 * | 4/2005 | Youn .................... 704/203 |
| 2006/0031075 A1 * | 2/2006 | Oh et al. ................. 704/500 |

FOREIGN PATENT DOCUMENTS

| JP | 06-243160 | 9/1994 |
| JP | 11031972 A | 2/1999 |
| JP | 2001-156644 | 6/2001 |
| JP | 2002-245027 | 8/2002 |

* cited by examiner

Primary Examiner—Talivaldis Ivars Smits
Assistant Examiner—David Kovacek
(74) Attorney, Agent, or Firm—Sughrue Mion, PLLC

(57) ABSTRACT

A synthesis filter for an MPEG audio decoder, and a decoding method thereof. The synthesis filter for an MPEG audio decoder includes a butterfly computation part which performs a butterfly computation with respect to an input MPEG audio subband sample by a predetermined unit, a matrix computation part which performs a matrix computation using a result of the butterfly computation, a first buffer which stores a result of the matrix computation according to a predetermined address, a window computation address generation part which generates first and second addresses with respect to the first buffer to use for each cycle of the window computation, a window computation part which outputs the matrix computation result stored to the first and second addresses to perform the window computation, and an output part which outputs a result of the window computation.

20 Claims, 7 Drawing Sheets

FIG. 6

|  | STARTING BLOCK | | | | | | ENDING BLOCK | | |
|---|---|---|---|---|---|---|---|---|---|
| IPQMF CYCLE 0 | 0 | 128 | 256 | 384 | 512 | 640 | 768 | 896 | ADDRESS SEQUENCE |
| IPQMF CYCLE 1 | 960 | 64 | 192 | 320 | 448 | 576 | 704 | 832 | |
| IPQMF CYCLE 2 | 896 | 0 | 128 | 256 | 384 | 512 | 640 | 768 | |
| IPQMF CYCLE 3 | 832 | 960 | 64 | 192 | 320 | 448 | 576 | 704 | |
| IPQMF CYCLE 4 | 768 | 896 | 0 | 128 | 256 | 384 | 512 | 640 | |
| IPQMF CYCLE 5 | 704 | 832 | 960 | 64 | 192 | 320 | 448 | 576 | |
| IPQMF CYCLE 6 | 640 | 768 | 896 | 0 | 128 | 256 | 384 | 512 | |
| IPQMF CYCLE 7 | 576 | 704 | 832 | 960 | 64 | 192 | 320 | 448 | |
| IPQMF CYCLE 8 | 512 | 640 | 768 | 896 | 0 | 128 | 256 | 384 | |
| IPQMF CYCLE 9 | 448 | 576 | 704 | 832 | 960 | 64 | 192 | 320 | |
| IPQMF CYCLE 10 | 384 | 512 | 640 | 768 | 896 | 0 | 128 | 256 | |
| IPQMF CYCLE 11 | 320 | 448 | 576 | 704 | 832 | 960 | 64 | 192 | |
| IPQMF CYCLE 12 | 256 | 384 | 512 | 640 | 768 | 896 | 0 | 128 | |
| IPQMF CYCLE 13 | 192 | 320 | 448 | 576 | 704 | 832 | 960 | 64 | |
| IPQMF CYCLE 14 | 128 | 256 | 384 | 512 | 640 | 768 | 896 | 0 | |
| IPQMF CYCLE 15 | 64 | 192 | 320 | 448 | 576 | 704 | 832 | 960 | |

FIG. 7

|  | STARTING BLOCK | | | | | | ENDING BLOCK | | |
|---|---|---|---|---|---|---|---|---|---|
| IPQMF CYCLE 0 | 96 | 224 | 352 | 480 | 608 | 736 | 864 | 992 | ADDRESS SEQUENCE |
| IPQMF CYCLE 1 | 32 | 160 | 288 | 416 | 544 | 672 | 800 | 928 | |
| IPQMF CYCLE 2 | 992 | 96 | 224 | 352 | 480 | 608 | 736 | 864 | |
| IPQMF CYCLE 3 | 928 | 32 | 160 | 288 | 416 | 544 | 672 | 800 | |
| IPQMF CYCLE 4 | 864 | 992 | 96 | 224 | 352 | 480 | 608 | 736 | |
| IPQMF CYCLE 5 | 800 | 928 | 32 | 160 | 288 | 416 | 544 | 672 | |
| IPQMF CYCLE 6 | 736 | 864 | 992 | 96 | 224 | 352 | 480 | 608 | |
| IPQMF CYCLE 7 | 672 | 800 | 928 | 32 | 160 | 288 | 416 | 544 | |
| IPQMF CYCLE 8 | 608 | 736 | 864 | 992 | 96 | 224 | 352 | 480 | |
| IPQMF CYCLE 9 | 544 | 672 | 800 | 928 | 32 | 160 | 288 | 416 | |
| IPQMF CYCLE 10 | 480 | 608 | 736 | 864 | 992 | 96 | 224 | 352 | |
| IPQMF CYCLE 11 | 416 | 544 | 672 | 800 | 928 | 32 | 160 | 288 | |
| IPQMF CYCLE 12 | 352 | 480 | 608 | 736 | 864 | 992 | 96 | 224 | |
| IPQMF CYCLE 13 | 288 | 416 | 544 | 672 | 800 | 928 | 32 | 160 | |
| IPQMF CYCLE 14 | 224 | 352 | 480 | 608 | 736 | 864 | 992 | 96 | |
| IPQMF CYCLE 15 | 160 | 288 | 416 | 544 | 672 | 800 | 928 | 32 | |

|  | GENERAL SYNTHESIS FILTER | CONVENTIONAL SYNTHESIS FILTER | SYNTHESIS FILTER ACCORDING TO EMBODIMENT OF PRESENT INVENTION |
|---|---|---|---|
| DECODING TIME (ms) | 11.294 | 10.87 | 8.76 |
| MEMORY CAPACITY (bits) | 4096 x 16 | 1568 x 16 | 1592 x 16 |

SYNTHESIS SUBBAND FILTER FOR MPEG AUDIO DECODER AND A DECODING METHOD THEREOF

CROSS-REFERENCE TO RELATED APPLICATIONS

This application claims priority from Korean Application No. 2003-99746, filed Dec. 30, 2003 in the Korean Intellectual Property Office, the disclosure of which is incorporated herein by reference.

BACKGROUND OF THE INVENTION

1. Field of the Invention

The present invention relates to a synthesis subband filter for a Moving Pictures Expert Group (MPEG) audio decoder, and a decoding method thereof. More particularly, the present invention relates to a synthesis subband filter for an MPEG audio decoder capable of fast decoding by simplifying computation of the synthesis filter which decodes a received MPEG audio subband sample, and a decoding method thereof.

2. Description of the Related Art

Synthesis filters for an MPEG audio decoder reconvert to a time domain a subband signal which is converted to a frequency domain. Since the synthesis filter require the most computation and processing time in the MPEG decoder, processing speed of the synthesis filter considerably affects the decoding speed of the MPEG audio decoder.

Generally, a header is separated from a received MPEG audio signal, and in case of MPEG-I, for example, the same decoding processes are performed per two channels. The synthesis filter, performing one of the decoding processes, performs the same computation with respect to each audio channel.

A frame of an MPEG audio layer-II corresponds to 1152 pulse code modulation (PCM) audio samples. Each audio frame comprises a 32-bit header part, a bit allocation part having information on the bit allocation, a 16-bit cyclic redundancy check (CRC) for protecting a scale factor selection information (SCFSI) from an error, a SCFSI for storing a transmission pattern of the scale factor, a 6-bit scale factor for designating a scale value of the subband sample, and an additional data field of the MPEG audio layer-II.

The MPEG audio layer-II has 32 subbands, and each subband comprises 36 subband samples. The 36 subband samples are grouped by a unit of three consecutive subband samples to form a granule, and are encoded and decoded by the granule unit. The 32 subbands are decoded at once. Since each granule requires decoding three time in order to be entirely decoded, and each subband has respectively 12 granules, decoding is performed a total of 36 times.

FIG. 1 is a flowchart for illustrating computation procedure of a conventional synthesis filter. In order to perform decoding, the synthesis filter comprises an inverse modified discrete cosine transform (IMDCT) part for a matrix computation, an inverse pseudo quadrature mirror filter (IPQMF) part for a window computation, and a memory for storing an interim result.

Hereinbelow, the computation procedure of the synthesis filter according to an International Standard Organization (ISO)/International Electrotechnical Committee (IEC) 11172-3 MPEG-I audio standard will be explained with reference to FIG. 1.

The synthesis filter receives an input of 32 new audio samples $S_k$, where k=0, 1, . . . , 31 (S110). A matrix computation result V[i] is shifted by 64 samples (S115), and the matrix computation is performed (S120).

The shifted matrix computation result V[i] is expressed by [Equation 1] as follows:

$$V[i]=V[i-64], i=1023, \ldots ,63 \quad \text{[Equation 1]}$$

In [Equation 1], 'i' is an index. The matrix computation can be expressed by [Equation 2] as follows:

$$V[i] = \sum_{k=0}^{31} N_{ik} X_k \quad \text{[Equation 2]}$$

In [Equation 2], i=0, 1, . . . , 63. A filter coefficient $N_{ik}$ is expressed by [Equation 3] as follows:

$$N_{ik}=\cos[(16+i)(2k+1)\pi/64] \quad \text{[Equation 3]}$$

In [Equation 3], i=0, 1, . . . , 63, and k=0, 1, . . . , 31.

When the matrix computation is completed, 512 vectors $U_i$ is generated (S130), and this is expressed by [Equation 4] as follows:

$$U[is64+j]=V[is128+j]$$

$$U[is64+32+j]=V[is128+96+j] \quad \text{[Equation 4]}$$

In [Equation 4], I=0, 1, . . . , 7, and j=0, 1, . . . , 31. By multiplying the generated vector U[i] by a synthesis window coefficient D[i], W[i] is generated (S135). Here, i=0, 1, . . . , 511. Using the W[i], 32 samples P[j] are calculated (S140), and the calculated samples are output (S145). This is expressed by following [Equation 5].

$$P[j] = \sum_{i=0}^{15} W_{j+32i} \quad \text{[Equation 5]}$$

In [Equation 5], j=0, . . . , 31.

The synthesis filter requires numerous computations and a considerable amount of time for the shift computation performed by the IMDCT part, the matrix computation, an address computation for recovering the 32 samples by the IPQMF part, and the window computation.

The filter coefficient $N_{ik}$ of [Equation 3] is symmetric, and accordingly, V[i] is symmetric. This is expressed by following [Equation 6].

$$V[i] = \sum_{k=0}^{15} N_{ik}[X_k + (-1)^i s X_{31-k}]$$

$$V[i] = -V[32-i], i = 0, \ldots, 32$$

$$V[i = V[96-i], i = 33, \ldots, 63 \quad \text{[Equation 6]}$$

In the conventional art, using the symmetry of the synthesis filter, the IMDCT part reduces the number of multiply-and-accumulate (MAC) operations from 2048 to 512, thereby decreasing the computation and demanded memory capacity. The memory section for storing the 512 computation results V[i] (I=0, . . . , 511) is divided into 32 blocks.

FIG. 2 is a view for illustrating a method for generating an address of the memory which stores the interim result of the synthesis filter. Referring to FIG. 2, 16 block addresses used for one computation cycle of the IPQMF part is expressed by one row. In FIG. 2, 16 rows for the totally 16 IPQMF computation cycles are shown.

The IPQMF cycle is a unit for one time of signal processing in the computation of the IPQMF part. Since the 16 block addresses used for one IPQMF cycle are not actual addresses of the memory which stores the 512 V[i]s, the addresses need to be re-calculated to read V[i] for the computation of the IPQMF part.

Therefore, when the conventional synthesis filter decodes, the shift computation is required, and the address is re-calculated using a stored block for the actual address. This causes complicated computation procedures, thereby demanding increased memory capacity. Moreover, the decoding process is delayed.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An aspect of the present invention is to solve at least the above problems and/or disadvantages and to provide at least the advantages described below. Accordingly, an aspect of the present invention is to provide a synthesis subband filter for an MPEG audio decoder, which is capable of reducing computing time for fast decoding, by outputting by a predetermined manner a matrix computation result which is stored by a predetermined manner to perform a window computation without performing a shift computation, and a decoding method thereof.

In order to achieve the above-described aspects of the present invention, there is provided a synthesis filter for an MPEG audio decoder comprises a butterfly computation part which performs a butterfly computation with respect to an input MPEG audio subband sample by a predetermined unit, a matrix computation part which performs a matrix computation using a result of the butterfly computation, a first buffer which stores a result of the matrix computation according to a predetermined address, a window computation address generation part which generates first and second addresses with respect to the first buffer to use for each cycle of the window computation, a window computation part which outputs the matrix computation result stored to the first and second addresses to perform the window computation, and an output part which outputs a result of the window computation.

The synthesis filter may further comprise a matrix computation address generation part for generating the predetermined address of the first buffer which stores the matrix computation result in a ring shape where an initial address neighbors a last address. The matrix computation address generation part may store the predetermined addresses beforehand.

The synthesis filter may further comprise a matrix coefficient storage part for storing and supplying a coefficient for the matrix computation to the matrix computation part. The synthesis filter may further comprise a window coefficient storage part for storing and supplying a coefficient for the window computation to the window computation part.

The synthesis filter may further comprise a second buffer which stores the results of the butterfly computation in a manner of sequentially storing first half of the results, and storing last half of the results in a reverse order. The second buffer sequentially stores the results of the butterfly computation in a manner of storing a result of adding computation, and storing a result of subtracting computation in a reverse order.

The window computation address generation part stores a part of the first and second addresses beforehand, and generates the addresses for each cycle of the window computation using the cyclic characteristic. The window computation address generation part stores the first and second addresses beforehand and supplies the addresses to the window computation part.

In order to achieve another aspect of the present invention, there is provided a decoding method for a synthesis filter of an MPEG decoder, comprising the steps of performing butterfly computation with respect to an input MPEG audio subband sample by a predetermined unit, performing matrix computation using a result of the butterfly computation, storing a result of the matrix computation according to predetermined addresses, generating first and second addresses with respect to the first buffer to use for each cycle of the window computation, outputting the matrix computation result stored to the first and second addresses to perform the window computation, and outputting a result of the window computation.

BRIEF DESCRIPTION OF THE DRAWING FIGURES

The above and other aspects of the present invention will become more apparent by describing in detail exemplary embodiments thereof with reference to the attached drawing figures, wherein;

FIG. 6 is a view for explaining the operation of a window computation address generation part for generating a first address, with respect to a first buffer which stores an interim result of the synthesis filter of FIG. 3;

FIG. 7 is a view for explaining the operation of a window computation address generation part for generating a second address, with respect to a first buffer which stores an interim result of the synthesis filter of FIG. 3;

DETAILED DESCRIPTION OF THE EXEMPLARY EMBODIMENTS

Hereinafter, exemplary embodiments of the present invention will be described in detail with reference to the accompanying drawing figures.

Figure 1:
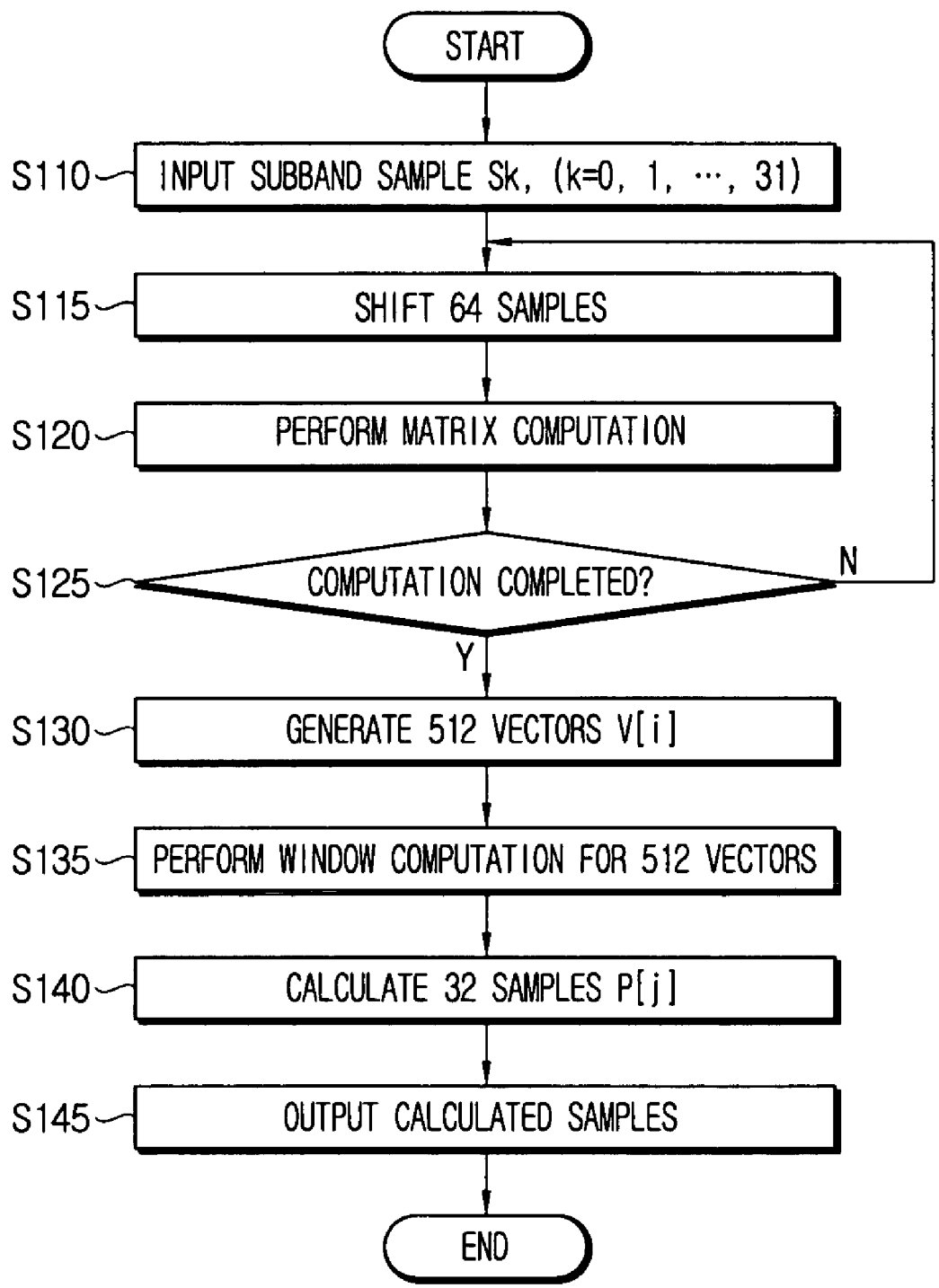
FIG. 1 is a view for explaining the computation procedure of a conventional synthesis filter.
Figure 2:
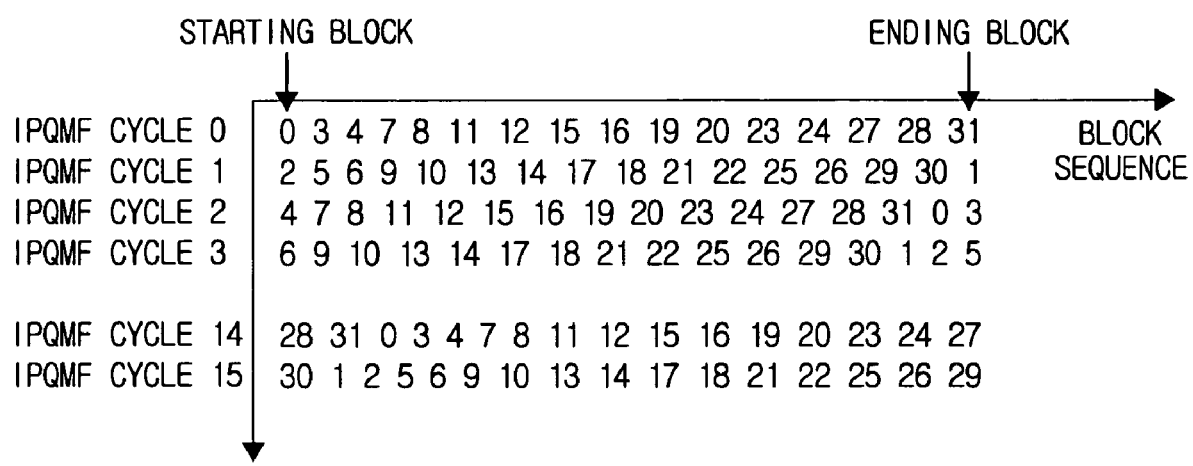
FIG. 2 is a view for explaining a method for generating an address of a memory which stores an interim result of the synthesis filter of FIG. 1.
Figure 3:
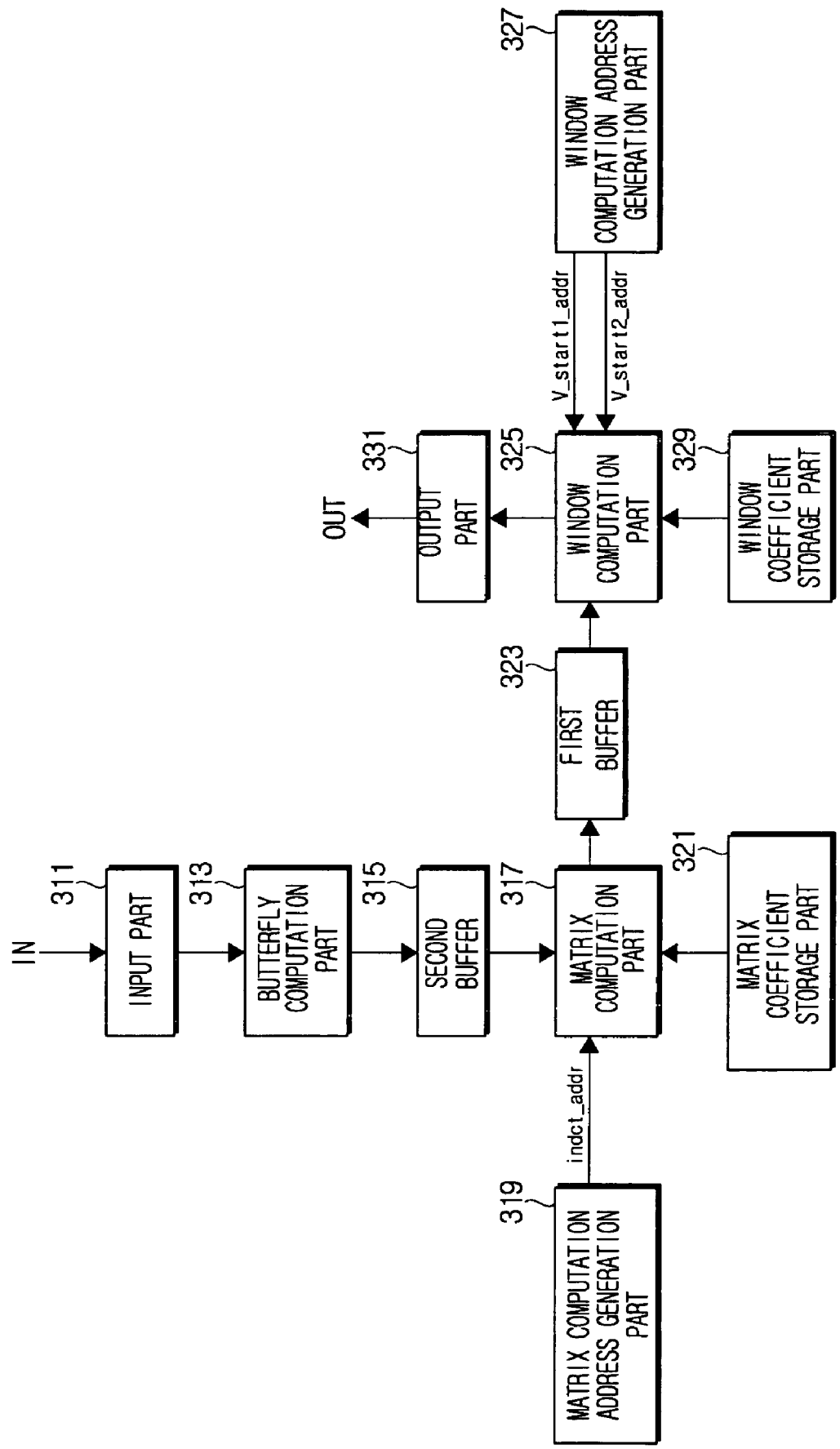
FIG. 3 is a view of a synthesis filter of an MPEG audio decoder according to an exemplary embodiment of the present invention.

FIG. 3 shows a synthesis filter of an MPEG audio decoder according to an exemplary embodiment of the present invention. Referring to FIG. 3, the synthesis filter comprises an input part 311, a butterfly computation part 313, a second buffer 315, a matrix computation part 317, a matrix computation address generation part 319, a matrix coefficient storage part 321, a first buffer 323, a window computation part 325, a window computation address generation part 327, a window coefficient storage part 329, and an output part 331.

Figure 4:
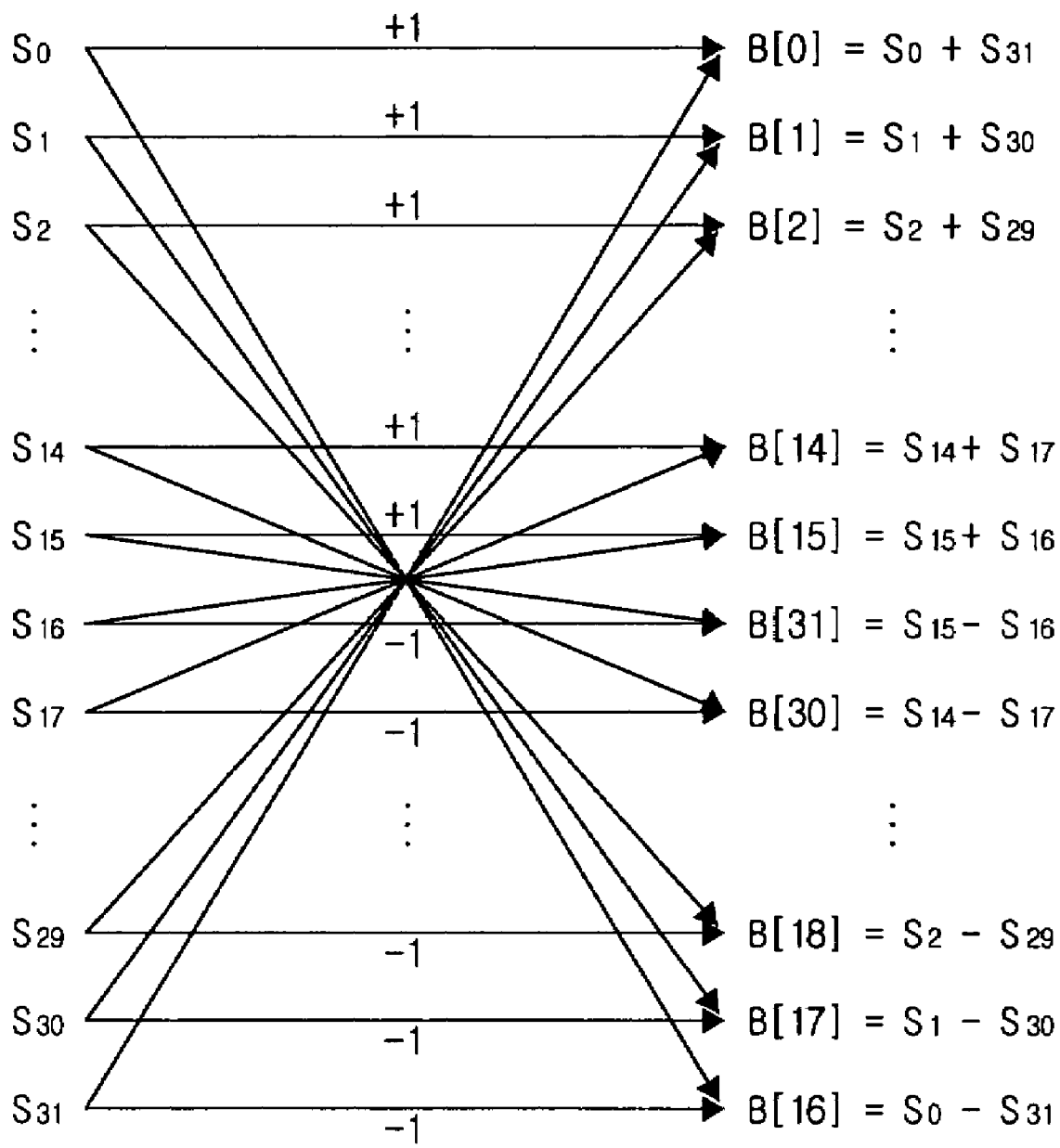
FIG. 4 is a view for explaining the operation of a butterfly computation part of FIG. 3.

The inputting part 311 receives an input of 32 subband samples $S_k$, (k=0, 1, . . . , 31) at once. The butterfly computation part 313 performs a butterfly computation using the input subband sample. FIG. 4 illustrates the operation of the butterfly computation part 313 of FIG. 3.

The butterfly computation part 313 performs butterfly computation with respect to two samples among the input 32 samples, sequentially from $s_0$ to $s_{31}$, as shown in FIG. 4. A following [Equation 7] expresses an output B[k] of the butterfly computation part 313.

$$B[k]=X_k+X_{31-k},\ i\text{:even}$$

$$B[k]=X_k-X_{31-k},\ i\text{:odd} \quad\quad\quad\quad\quad\quad\quad\quad\quad [\text{Equation 7}]$$

The output B[k] of the butterfly computation part 313 is an output of an adding computation or an output of a subtracting computation according to an index 'i' of V[i] which is a computation result of a matrix computation. The matrix computation part 317 alternately uses the outputs of the adding or subtracting butterfly computations depending whether the index 'i' is an even number or an odd number as the index 'i' of the V[i] is linearly increased, which is induced from the symmetry of $N_{ik}$, as shown in [Equation 6]. Referring to [Equation 6], with respect to the output of the subtracting butterfly computation, the matrix computation part 317 uses the results of the butterfly computations, reversely from $s_{31}$ to $s_{16}$.

Therefore, when the outputs of the butterfly computation part 313 are stored to the second buffer 315, for first 16 outputs B[k] of k=0, . . . , 15, the outputs of the adding computations are sequentially stored when the index 'i' is even, for next 16 outputs B[k] of k=16, . . . , 31, the outputs of the subtracting computations are reversely stored when the index 'i' is odd. As a result, the matrix computation part 317 is able to sequentially use the outputs B[k] as stored in the second buffer 315, that is, in an increasing order of the index 'k'. Therefore, the computation is quickly performed without other additional operations.

In the conventional synthesis filter, 64-sample shift computation should be performed. The 64-sample shift computation, V[i]=V[i-64] (i=1024, . . . , 64), needs to be repeatedly performed even in one computation cycle, moreover, to process one MPEG audio frame, the computation cycles should be repeated 36 times. Therefore, for the shift computation process, considerable computations and time are required, thereby causing delay in the entire decoding process.

In the conventional synthesis filter, 64 samples are shifted at each matrix computation, and V[i] returns its initial position every 16 times of the shift computation. Since an exemplary embodiment of the present invention uses the cyclic characteristic of V[i], the shift computation is omitted.

Figure 5:
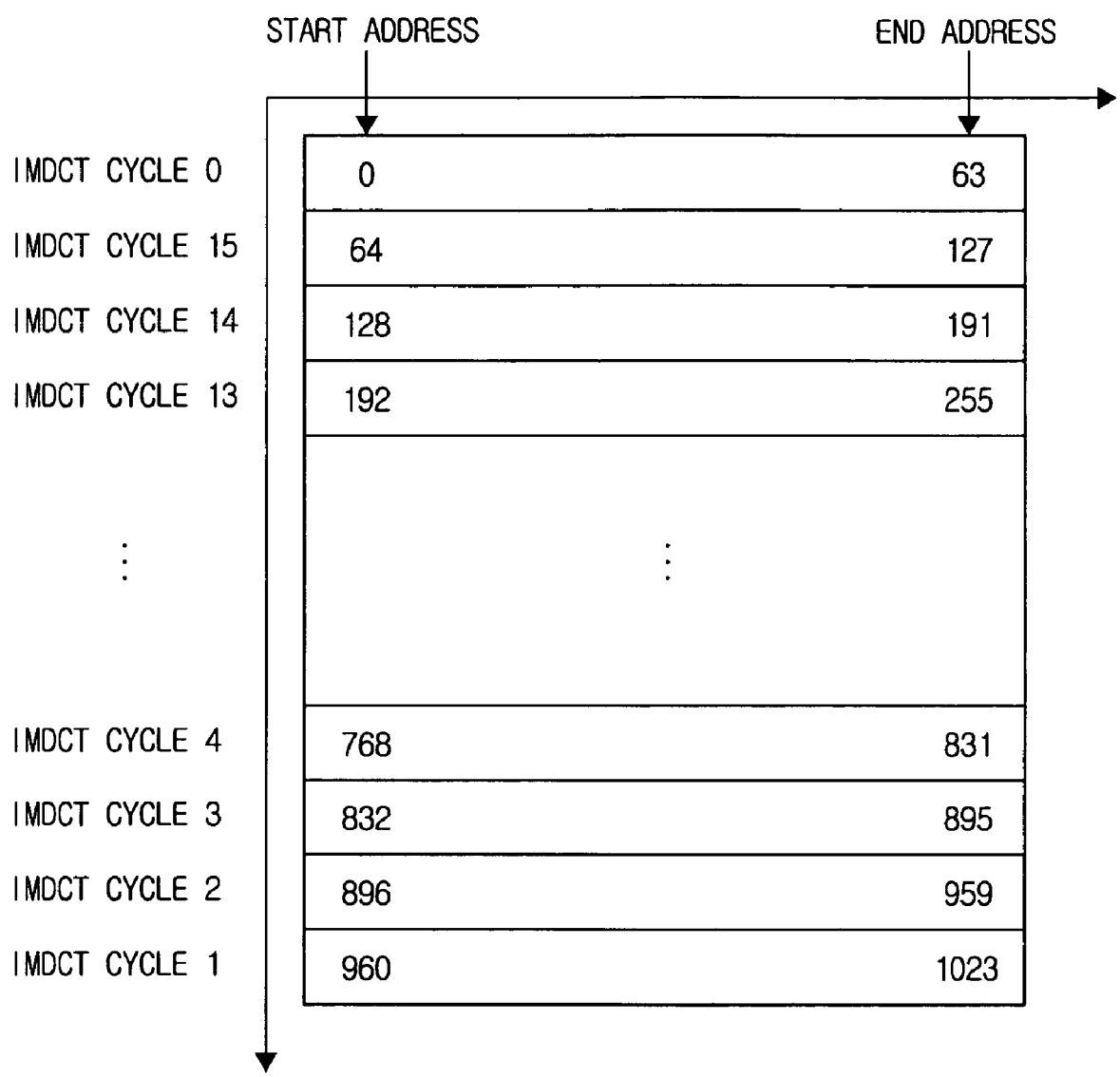
FIG. 5 is a view for explaining the operation of a matrix computation address generation part for storing an interim result of the synthesis filter of FIG. 3.

FIG. 5 illustrates the operation of the matrix computation address generation part which stores an interim result of the synthesis filter of FIG. 3. Referring to FIG. 5, the matrix computation address generation part 319 generates the address for storing the computation result of the matrix computation part 317.

The matrix computation part 317 performs the matrix computation using a value output from the second buffer 315 and a value output from the matrix coefficient storage part 321, and stores to the first buffer 323 the V[i] output by the matrix computation according to the address supplied from the matrix computation address generation part 319.

Referring to FIG. 5, the matrix computation part 317 stores 64 samples 16 times per an inverse modified discrete cosine transform (IMDCT) cycle, and the index 'i' of V[i] of the first buffer 323 for storing 64 samples linearly increases. Therefore, the matrix computation address generation part 319 indicates only the initial address of the respective IMDCT computation cycles. This is expressed by [Equation 8] as follows.

imdct.addr=imdct.addr-64 if (imdct.addr<)

imdct.addr=imdct.addr+1024 [Equation 8]

Referring to FIG. 5, the first 64 samples by the matrix computation are stored to a top layer of the first buffer 323, and the second 64 samples are stored to a bottom layer of the first buffer 323. The third 64 samples are sequentially stored to the first buffer 323 from a layer next to the bottom layer to a layer next to the top layer storing the first 64 samples. Thus, a total of 1024 samples from the 16 cycles are stored to the first buffer 323 according to the generated address, in a ring shape, so that the initial address is next to the last address. Therefore, the shift computation required in the conventional synthesis filter becomes dispensable.

FIG. 6 is a view for explaining the operation of a window computation address generation part for generating the first address, with respect to a first buffer which stores an interim result of the synthesis filter of FIG. 3. FIG. 7 is a view for explaining the operation of a window computation address generation part for generating a second address, with respect to a first buffer which stores an interim result of the synthesis filter of FIG. 3.

The window computation part 325 performs a window computation by multiplying a window coefficient output from the window coefficient storage part 329 by a computed value stored to the first buffer 323 of the address supplied from the window computation address generation part 327. In this case, the window computation address generation part 327 has to supply two addresses, and the window computation part 325 outputs the computed values respectively stored to the first and second addresses which are supplied from the window computation address generation part 327, and outputs the window coefficient at the window efficient storage part 329 to perform the window computation.

The first and second addresses output from the window computation address generation part 327 are addresses applied with [Equation 4]. However, the window computation address generation part 327 can store beforehand and output the address without applying computation of [Equation 4] every time. Therefore, the window computation address generation part 327 needs eight addresses per window computation cycle, and since 16 window computation cycles are required, a total of 128 addresses need to be stored.

Referring to FIG. 6 and FIG. 7, the first and second addresses circulate every two IPQMF cycles. Using this characteristic, only 32 addresses (2*2*8=32) are required to perform a simple computation with the first and second addresses in order to generate all necessary addresses. Therefore, the window computation address generation part 327 does not store all the addresses shown in FIG. 6 and FIG. 7, but stores only the addresses corresponding to the two IPGMF cycles respectively to the first and second addresses, and generates required addresses for the respective cycles. In essence, the window computation address generation part 327 only stores the address for the two window computation cycles instead of storing all addresses, and outputs the required address for each cycle through a simple computation.

The output part 331 outputs a result of the computation performed in the window computation part 325. For this, the output part 331 may comprise a buffer (not shown) to temporarily store the computation result before outputting the result. The output part 331 converts the computation result and outputs a signal converted to fit a format of a device which will apply the output part 331.

Figures 8, 9:
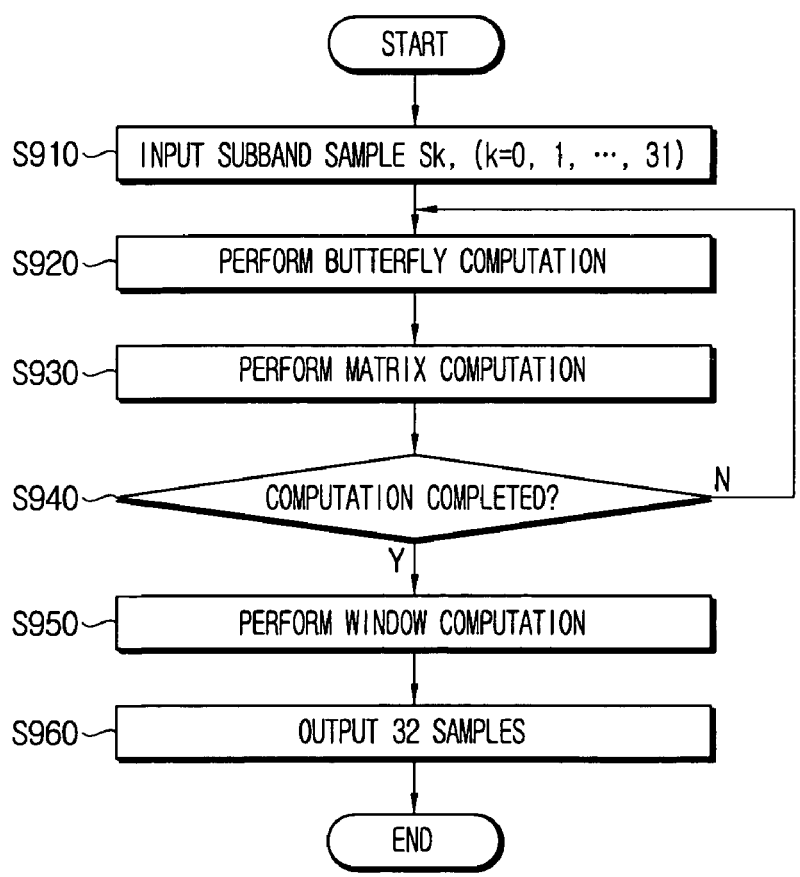
FIG. 8 is a table for comparing decoding time and a desired memory capacity of the synthesis filter of FIG. 3 with those of a conventional synthesis filter.
FIG. 9 is a flowchart for illustrating a decoding method of the synthesis filter according to an exemplary embodiment of the present invention.

FIG. 8 is a table for comparing decoding time and a desired memory capacity of the synthesis filter of FIG. 3 with those of a conventional synthesis filter. FIG. 8 shows result values of required time for decoding 24 ms audio frame by 72 MHz clock 16-bit Teak digital signal processor (DSP) core, in a dual-channel MPEG-II audio of 48 kHz sampling frequency.

Referring to FIG. 8, in the conventional synthesis filter, the memory size has been considerably reduced using the symmetry of the matrix coefficient, however, the decoding time is not reduced enough due to the shift computation and complicated generation of the address for the memory. In the synthesis filter according to an exemplary embodiment of the present invention, although the memory size is not satisfactory compared to one in the conventional art, the decoding time is much reduced as much as 2.11 ms, e.g., 151, 920 clock cycles.

FIG. 9 is a flowchart for illustrating a decoding method of the synthesis filter according to an exemplary embodiment of the present invention. Referring to FIG. 9, 32 subband samples $S_k$, (k=0, 1, ..., 31) are input to the synthesis filter (S910). The butterfly computation is performed with respect to the input subband samples $S_k$, (k=0, 1, ..., 31) (S920), and the computation result B[i] is stored to the second buffer 315 according to a sign of the computation result B[i] in an ascending order of the index 'i' of FIG. 4.

The matrix computation is performed using the stored result of the butterfly computation and the matrix coefficient (S930), the result of the matrix computation is stored to the initial memory address of the first buffer 323 output from the matrix computation address generation part 319. When the matrix computation is completed with respect to the 32 subband samples (S940), the window computation follows. Until the matrix computation is completely performed with respect to the 32 subband samples, the matrix computation is repeated.

When the matrix computation is completed for the 32 subband samples, the window computation is performed (S950). The window computation address generation part 317 outputs the first and second addresses, and uses the matrix computation values stored to the two addresses and the window coefficient. Therefore, the 32 samples which are applied with the window computation are outputted through the output part 331.

According to an exemplary embodiment of the present invention, when decoding an input MPEG audio subband sample using the synthesis filter, the result of the butterfly computation is stored in a predetermined manner so as to be used for the matrix computation as it is without requiring other additional operation, and the result of the matrix computation is stored in a predetermined manner without requiring the shift computation. In addition, by supplying two addresses for each cycle for the window computation, time for the shift computation can be saved, and the matrix computation is facilitated. Furthermore, since the address computation is omitted in the window computation, decoding speed of the MPEG audio is enhanced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A synthesis filter for a moving picture experts group (MPEG) decoder, the synthesis filter comprising:
    a butterfly computation part which performs a butterfly computation with respect to a Moving Pictures Expert Group (MPEG) audio subband sample;
    a matrix computation part which performs a matrix computation using a result of the butterfly computation;
    a first buffer which stores a result of the matrix computation according to predetermined addresses;
    a window computation address generation part which generates a first address and a second address with respect to the first buffer to use for each cycle of a window computation; and
    a window computation part which outputs the matrix computation result stored to the first and second addresses and performs the window computation using the matrix computation result stored to the first and second addresses.

2. The synthesis filter of claim 1, further comprising a matrix computation address generation part which generates the predetermined addresses of the first buffer in a ring shape where an initial address is next to a last address, wherein the initial address and the last address correspond to a top layer and a second layer of the first buffer, respectively, and a second address corresponds to a bottom layer of the first buffer.

3. The synthesis filter of claim 2, wherein the matrix computation address generation part stores the predetermined addresses beforehand.

4. The synthesis filter of claim 1, further comprising a matrix coefficient storage part which stores a coefficient for the matrix computation and provides the coefficient for the matrix computation to the matrix computation part.

5. The synthesis filter of claim 1, further comprising a window coefficient storage part which stores a coefficient for the window computation and provides the coefficient for the window computation to the window computation part.

6. The synthesis filter of claim 1, further comprising a second buffer which stores the result of the butterfly computation by sequentially storing a first half of the result, and then storing a second half of the result in a reverse order,
    wherein the matrix computation part sequentially outputs and uses the butterfly computation result stored in the second buffer for the matrix computation.

7. The synthesis filter of claim 6, wherein the second buffer sequentially stores the result of the butterfly computation by storing a result of an adding computation corresponding to the first half of the result in a sequential order, and storing a result of a subtracting computation corresponding to the second half of the result in a reverse order.

8. The synthesis filter of claim 1, wherein the window computation address generation part stores a part of the first and second addresses beforehand, and generates the first and second addresses for each cycle of the window computation using a cyclic characteristic.

9. The synthesis filter of claim 1, wherein the window computation address generation part stores the first and second addresses beforehand and supplies the first and second addresses to the window computation part.

10. A decoding method for a synthesis filter of a Moving Pictures Expert Group (MPEG) decoder, the method comprising:

performing a butterfly computation with respect to an MPEG audio subband sample;

performing a matrix computation using a result of the butterfly computation;

storing in a first buffer a result of the matrix computation according to a predetermined address;

generating a first address and a second address with respect to the first buffer to use for each cycle of a window computation; and outputting the matrix computation result stored to the first and second addresses to perform the window computation.

11. The method of claim 10, wherein the storing in the first buffer comprises generating the predetermined addresses in a ring shape where an initial address is next to a last address, and stores the matrix computation result according to the generated predetermined addresses, and wherein the initial address and the last address correspond to a top layer and a bottom layer of the first buffer, respectively and a second address corresponds to a bottom layer of the first buffer.

12. The method of claim 11, wherein the storing in the first buffer further comprises storing the predetermined addresses beforehand, and storing the matrix computation result according to the stored predetermined addresses.

13. The method of claim 10, further comprising storing a coefficient for the matrix computation and supplying the coefficient for the matrix computation to the matrix computation part.

14. The method of claim 10, further comprising storing a coefficient for the window computation and supplying the coefficient for the window computation to the window computation part.

15. The method of claim 10, further comprising storing the result of the butterfly computation by sequentially storing a first half of the result, and storing a second half of the result in a reverse order, and wherein the performing the matrix computation comprises sequentially outputting and using the stored butterfly computation result for the matrix computation.

16. The method of claim 15, wherein the storing the result of the butterfly computation comprises storing the result of the butterfly computation by storing a result of an adding computation and storing a result of a subtracting computation in a reverse order.

17. The method of claim 10, wherein the generating the first address and the second address comprises storing a part of the first and second addresses beforehand, and generating the first and second addresses for each cycle of the window computation using a cyclic characteristic.

18. The method of claim 10, wherein the generating the first address and the second address comprises storing the first and second addresses beforehand and supplying the first and second addresses for performing the step of performing window computation.

19. The synthesis filter of claim 2, wherein the initial address and the last address store the matrix computation results from a first and a last cycle of inverse modified discrete cosine transform (IMDCT) of the MPEG audio subband sample.

20. The decoding method of claim 11, wherein the initial address and the last address store the matrix computation results from a first and a last cycle of inverse modified discrete cosine transform (IMDCT) of the MPEG audio subband sample.

* * * * *